United States Patent
Yerazunis et al.

(10) Patent No.: US 10,994,371 B2
(45) Date of Patent: May 4, 2021

(54) SYSTEM AND METHOD FOR DEPOSITING A METAL TO FORM A THREE-DIMENSIONAL PART

(71) Applicant: Mitsubishi Electric Research Laboratories, Inc., Cambridge, MA (US)

(72) Inventors: William S Yerazunis, Acton, MA (US); John C Barnwell, III; William T Vetterling, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 305 days.

(21) Appl. No.: 15/052,034

(22) Filed: Feb. 24, 2016

(65) Prior Publication Data

US 2017/0239753 A1    Aug. 24, 2017

(51) Int. Cl.
| | |
|---|---|
| *B23K 26/346* | (2014.01) |
| *B23K 26/14* | (2014.01) |
| *B23K 26/342* | (2014.01) |
| *B23K 26/08* | (2014.01) |
| *B33Y 10/00* | (2015.01) |
| *B33Y 30/00* | (2015.01) |

(52) U.S. Cl.
CPC ......... *B23K 26/346* (2015.10); *B23K 26/083* (2013.01); *B23K 26/1423* (2013.01); *B23K 26/342* (2015.10); *B33Y 10/00* (2014.12); *B33Y 30/00* (2014.12)

(58) Field of Classification Search
CPC .. B23K 26/346; B23K 26/342; B23K 26/083; B23K 26/1423; B33Y 10/00; B33Y 30/00; B33Y 40/00

USPC .... 219/76.17, 121.6, 121.64, 121.65, 121.66
See application file for complete search history.

(56) References Cited

U.S. PATENT DOCUMENTS

| | | | |
|---|---|---|---|
| 4,547,654 A * | 10/1985 | Stol ...................... | B23K 9/1093 |
| | | | 219/136 |
| 4,904,843 A * | 2/1990 | Hori ...................... | B23K 9/091 |
| | | | 219/137 PS |
| 6,143,378 A | 11/2000 | Harwell et al. | |

(Continued)

FOREIGN PATENT DOCUMENTS

| | | |
|---|---|---|
| CN | 103567650 | 2/2014 |
| CN | 203817392 | 9/2014 |

(Continued)

OTHER PUBLICATIONS

Dietz., Forced Air Cooling Primer, for the Electronic Engineer. www.lowpressure.com., The Henry G. Dietz Company, Inc. 14-26 28th Ave., Long Island City 2, NY., 1102., USA.

*Primary Examiner* — Tu B Hoang
*Assistant Examiner* — Masahiko Muranami
(74) *Attorney, Agent, or Firm* — Gennadiy Vinokur; Hironori Tsukamoto

(57) ABSTRACT

A system and method depositing metal to form a three-dimensional (3D) part on a substrate. A wire is moved relative to a location on the substrate while a laser heats a proximal end of the wire at the location using a laser beam. The laser causes the wire and substrate to reach a melting point of the wire to fuse the wire at the location on the substrate. The wire can be preheated by passing a current through the wire.

11 Claims, 1 Drawing Sheet

(56) References Cited

U.S. PATENT DOCUMENTS

| | | | | |
|---|---|---|---|---|
| 2008/0264923 A1* | 10/2008 | White | ............... | B23K 9/092 |
| | | | | 219/137 PS |
| 2010/0059493 A1* | 3/2010 | McAninch | ............ | B23K 9/133 |
| | | | | 219/137 PS |
| 2010/0176109 A1* | 7/2010 | Peters | ............... | B23K 26/342 |
| | | | | 219/137.61 |
| 2011/0297658 A1* | 12/2011 | Peters | ............... | B23K 9/02 |
| | | | | 219/162 |
| 2013/0020289 A1* | 1/2013 | Peters | ............... | B23K 9/125 |
| | | | | 219/121.6 |
| 2013/0264323 A1* | 10/2013 | Daniel | ............... | B23K 9/093 |
| | | | | 219/137 PS |
| 2013/0299461 A1* | 11/2013 | Fisher | ............... | B23K 9/173 |
| | | | | 219/73.2 |
| 2014/0042131 A1* | 2/2014 | Ash | ............... | B23K 35/02 |
| | | | | 219/121.66 |
| 2014/0263191 A1* | 9/2014 | Zapata | ............... | B23K 28/02 |
| | | | | 219/74 |
| 2014/0374391 A1* | 12/2014 | Cole | ............... | B23K 9/124 |
| | | | | 219/121.45 |
| 2015/0209889 A1 | 7/2015 | Peters et al. | | |
| 2015/0209913 A1* | 7/2015 | Denney | ............. | B23K 35/0272 |
| | | | | 219/76.14 |
| 2015/0328719 A1 | 11/2015 | Jarvis et al. | | |

FOREIGN PATENT DOCUMENTS

| | | |
|---|---|---|
| CN | 104874794 | 9/2015 |
| DE | 3905684 A1 | 8/1990 |
| EP | 1384547 | 1/2004 |
| JP | 2010227951 | 10/2010 |

* cited by examiner

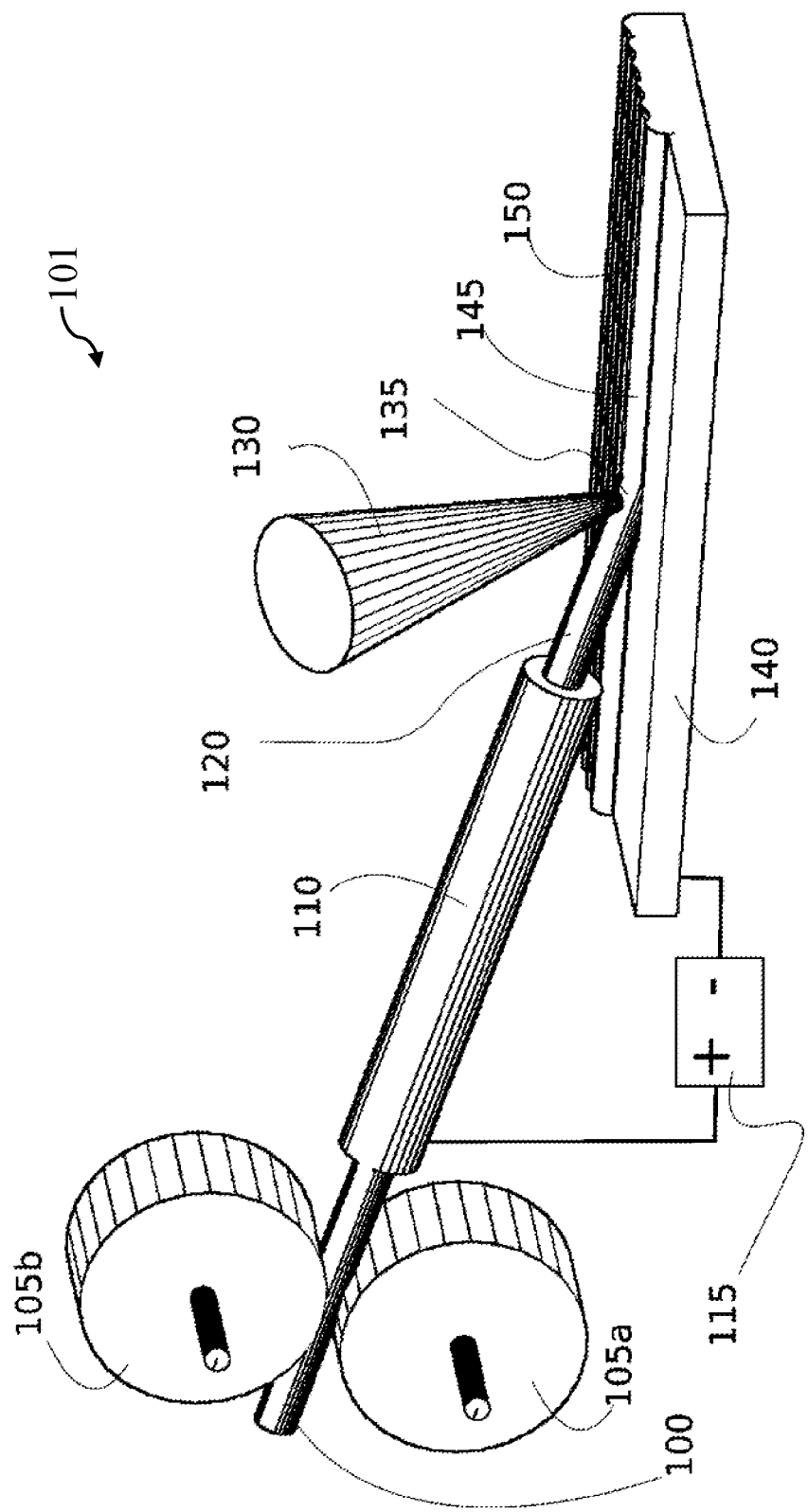

SYSTEM AND METHOD FOR DEPOSITING A METAL TO FORM A THREE-DIMENSIONAL PART

FIELD OF THE INVENTION

This invention relates generally to 3D printing, and more particularly to a combined laser and ohmic heating system and method to deposit metal to produce a metal part from wire feedstock.

BACKGROUND OF THE INVENTION

Three-dimensional printing (3D printing) is now a well-known technology, which can be used for rapid prototyping, and for constructing fully functioning parts. 3D printing is also known as "additive manufacturing," because unlike most machine tool operations, undifferentiated feed material is repeatedly added to construct a part using successive layers of a material such as plastic or metal. This is different from traditional machine-shop operations, such as sawing, drilling, turning, and milling, which removes material in successive layers until only the desired material remains.

Most common and inexpensive 3D printers produce the desired parts using a plastic material, by either fused deposition modeling (FDM), i.e., precision extrusion of a thin filament of feed plastic via a nozzle controlled in X, Y, and Z directions, or by stereolithography (SLA), where a feedstock of photopolymerizable plastic is selectively catalyzed with deep blue or ultraviolet light, in successive thin layers.

The limitation of such printers is that the final result is plastic, and as such cannot withstand high stresses or high temperatures. Most of the plastics available for FDM and SLA have both yield strengths (where the material permanently distorts) and ultimate tensile strengths (where the material fails completely) well below 50 Mpa (50 million newtons/square meter), compared to even the weakest steels at 250 Mpa and going upward to as high as 2500 Mpa for maraging steels and other specialty alloys.

Similarly, the operating temperature limitation for most polymers extrudable by FDM printers is typically 20 degC, or more, well below the glass transition temperature of the polymer, to avoid high creep rates. For example, acrylonitrile butadiene styrene (ABS) plastic, a tough thermoplastic, has a glass transition temperature of roughly 105 degC, which will creep excessively at the boiling point of water (100 degC), and should not be used where boiling water temperatures are encountered.

SLA printers have different material limitations given that the transition of the feed material from liquid to solid is triggered by ultraviolet light, or intense blue light. Only polymers that can be catalyzed by such radiation, including those that use a photoinitiator to achieve this sensitivity to photopolymerization, can be printed at all. Styrene, epoxy, and acrylic can also be used. However, the temperature limitations of these materials remain.

Given the material limitations of both strength and temperature tolerance, polymer 3D printed parts cannot be used in many situations, such as engines, fuel systems, or many biological implant systems. For those applications, the part needs to be made of metal. Metal 3D printers can be categorized as follows: mold-making systems, metal-sinter systems, and full-density systems.

In a mold-making system, an FDM or SLA machine produces a positive example of the desired metal part using plastic. Then, the plastic part is used to produce a negative mold, often destructively, as in lost-wax or lost-plastic methods. The temperature-resisting mold (often ceramic slurry) is heated to successively higher temperatures to melt and vaporize the 3D plastic positive, Finally, molten metal is cast into the now-empty void and allowed to cool, yielding the part. Unfortunately, this process requires significant time and a fully capable foundry facility to produce the parts, which are basically no different than the millenia-old lost wax process, and with the same limitations on molding and precision.

In 3D metal-sintering processes, a high-melting-point metal such as stainless steel is powdered (often in an inert atmosphere such as nitrogen or argon, to minimize oxidation), and then spread in a thin layer over a base plate by a moving "doctor blade." A laser is then used to heat the powder selectively, to sinter the powder and form one layer of the desired final part. Successive additional thin layers of metal powder are spread over the base plate, and again selectively sintered. The resulting layers, sintered together, are termed a "green part", and are quite fragile. The green parts are placed in a crucible, supported in a bed of refractory powder, and placed in contact with bars and risers made of a low-melting-point alloy, such as brass or bronze. The entire crucible is then heated slowly in a reducing atmosphere (to prevent oxidation of any of the metals), and maintained at temperature until the brass or bronze completely infiltrates the interconnected voids in the part, yielding a finished part of near 100% density.

That process is limited to facilities that support a bronze foundry, and to produce parts that are not of one alloy (the parts are partially stainless steel and partially bronze or brass. They are also subject to self-produced electrolytic corrosion.

Full-density 3D metal printers work by starting with the metal feedstock and reducing the stock to a fine powder (again, in an inert atmosphere to minimize oxidation). Like the sintering process, a laser (under an inert gas atmosphere) or an electron beam (in a vacuum chamber) is used to selectively melt the powder and fully fuse it into a solid mass in the desired layer shape. The process repeats; alternately a thin layer of metal powder is spread by the doctor blade, and then fused with the prior layers and lateral sections of powder. These parts are at near (99% solid) and can approach the substantially void free (99.9% solid, or "full density") state and are often called "DMLS" parts (Direct Metal Laser Sintering), even though the metal is fully fused, not merely sintered.

The advantage of full-density processes is that it yields a high quality part directly, with no need for a full foundry-level infrastructure. Some final cleanup, such as precision machining, grinding, or polishing may still be required, as the surface of the part is still the un-fused sides of the partially fused metal powder (thus, spherical powdered metals produced by atomization yield a smoother final part than the angular powdered metals produced by abrasion, flaking, grinding, or crystallization from solution.), and so a metal machining facility may still be appropriate, which is a disadvantage compared to polymer 3D printing systems that usually produce ready-to-use parts.

A second disadvantage of full-density DMLS is cost. The process is quite slow as the energy to melt the powder must be supplied either by the laser or an electron beam, and delivered sufficiently precisely to cause full fusion but not vaporization or over-melting. This lack of speed translates into a long time to print, which translates directly into a high cost per part to amortize the up-front cost of the physical machine and the slow production available.

A third disadvantage of DMLS is that the feed powder is only partially reclaimable. A significant fraction of the powder along the edge of the laser or electron beam path partially fuses, agglomerates, or sinters together with adjacent particles, but does not fuse firmly to the produced final part. These larger lumps must be removed from the remaining feed powder, when the feed powder is to be re-used again by careful sifting, through extremely fine mesh screens (an undependable method). Some DMLS manufacturers simply preclude the re-use of feedstock powder unilaterally because of the risk of a too-large particle being caught by the doctor blade and plowing a line without powder into the thin top layer, causing a void in the part.

Finally, DMLS feed materials are extremely finely divided metal powders, and as such are potentially hazardous (such as inhalation hazard, possible flammability or even pyrophoric hazard), as well as requiring special handling, such as keeping the powder under inert gas such as argon to prevent any oxidation forming during transport and storage.

Another method uses an XYZ translation system and a conventional metal inert gas (MIG) wire-fed arc welding machine to deposit metal. Disadvantages are that because the system uses an arc, a large amount of spatter is present and the surface finish is no better than what one would expect in an arc-welded joint—that is, surface roughness is on the order of a couple of millimeters, not 10-100 microns as with other 3D printing technologies.

Laser powder deposition (LPD—an extension of the well-known laser cladding process—uses similar powder feedstocks, but rather than progressively filling the build volume layer by layer with metal powder that is selectively sintered or melted, the powder is blown onto the substrate or previous deposit by the inert gas stream, while simultaneously a high-powered laser both melts the powder while in the flowing gas stream, and heats the substrate to the melting point. The deposited material is substantially smoother than the MIG welder wire-fed deposition methods but still requires final finishing with conventional machining.

Laser Metal Deposition-Wire (LIVID-w) is yet another process is akin to the well-known laser cladding process, but that uses a metal wire feedstock rather than metal powder. The high-powered laser melts the wire and raises the temperature of the base material to welding heat, causing the material to fuse. Of course, this process must be carried out in a vacuum or an inert gas atmosphere such as argon. A similar alternative is Electron Beam Additive Manufacturing-wire (EBAM-w) where the melting heat is supplied by an electron beam. EBAM-w must be performed in a vacuum chamber due to the electron beam. Both LMD-w and EBAM-w have the property that they use much less expensive and less hazardous wire feedstock, rather than powdered metals.

LMD-w is unfortunately process-limited to relatively large diameter wires (0.028 inch-0.7 mm) due to thermal issues as described below which sets a rather large feature size and relatively coarse printing with rough final surfaces. EBAM-w is limited by the ability of electron beam currents at welding energy. Increasing the electron beam accelerating voltage causes a deeper penetration of the electron beam (a useful property of electron beam weld melt zones is that they can be as much as three to five times deeper than their width), but this is detrimental during additive manufacturing as it will cause a vertical wall to slump downward due to gravitation and to form a blobby surface due to surface tension. The other alternative is to have a low beam voltage but a high beam current; in this case the beam diameter is large because the space charge density of electrons in the beam causes self-repulsion of the electrons with a $1/r^2$ intensity. These factors together set a lower bound on the ability of LMD-w or EBAM-w to provide a smooth surface and fine details in the produced part.

SUMMARY OF THE INVENTION

The embodiments of the invention provide a system and method for 3D printing metals with a precision and full density of the DMLS process but at a much lower cost, by increasing the speed of production, improving the as-printed surface finish, and using a feedstock with much lower costs of production and ease of handling.

The invention provides this by using a feedstock of fine wire (size typically of 0.003 to 0.010 inch (80 microns to 200 microns), commonly available, providing a wire-and-workpiece preheat by means of ohmic heating by a current passed through the metal wire and metal workpiece, and final placement heating provided by means of a laser.

Because the feedstock is metal wire, handling hazards are greatly reduced. Because the wire feed is placed with precision only where material needs to be deposited, there is no wasted feedstock, and because a large fraction of the heating energy is produced by ohmic heating of the wire, the wire heats uniformly in bulk, rather than only at the surface as with laser-only or electron-beam-only heating, so effectively the system can deposit material much more rapidly, on the order of a kilogram per hour, which decreases the time per part, and amortizes the cost of the machine much more rapidly, producing a much less expensive part.

BRIEF DESCRIPTION OF THE DRAWINGS

FIG. 1 is elevated side view of a system for printing a three-dimensional metallic part according to embodiments of the invention.

DETAILED DESCRIPTION OF THE PREFERRED EMBODIMENTS

FIG. 1 is an elevated side view of the system according to embodiments of the invention. The system 101 includes feedstock wire 100 is moved by drive rollers 105a and 105b. The feedstock wire 100 passes through the wire guide and electrical contact tube 110. A power supply 115 supplies a controlled amount of current through the contact tube 110, the feedstock wire 100, through a workpiece 140, with the current returning to the power supply 115.

The required amount of current for a wire 0.006 inches (about 150 microns) is very moderate—only about six to nine amperes, at a nominal 1 Kg/hour deposition rate for steel, and far, far below the tens to hundreds of amperes that would be used for processes such as MIG welding or MIG cladding.

The ohmic heating supplied in section 120 of the feedwire 100 is intentionally insufficient to melt the wire. Instead, the wire 100 continues to a laser beam 130 supplied by a laser 130, focused at the intersection of the hot wire 100 and the base substrate (prior layer) 140, at focus point 135. That is, only the proximal end of the wire in contact with the substrate is heated to a melting point by the laser beam. Note that the means for moving the wire, the substrate, the laser beam, controlling the electric current and controlling the laser power can be controlled independently, as well as controlled in a coordinated manner.

Both the current from power supply 115 and the energy of laser beam 130 raise the bulk temperature of the wire and the surface temperature of the substrate at focus point 135 to well above the melting point of the feedstock wire 100, and the feedstock wire 100 welds to the surface of the substrate 140. The form of the weld surface is determined by the surface tension of the melted metal, which then solidifies into cooling deposit 145 very rapidly. Repeated passes of the process produce a built up area of solid metal 150 to construct a final desired 3D metal part.

If feedstock wire 100 is an inert metal (such as gold, platinum, tantalum, etc.), then the process can be carried out in open air. However, if the feedstock wire 100 is a more common alloy, such as carbon or alloy steel, aluminum, titanium, etc., then the heated region 120, molten region 135, and cooling deposit 145 can kept under an inert atmosphere, or alternatively in a vacuum chamber. Since the temperatures are relatively low compared to an arc process, the inert atmosphere can be argon, carbon dioxide, or even very inexpensive nitrogen.

Note that the proximal end of the wire in focus region 135 of the laser beam 130 is completely molten and subject only to gravity and surface tension to determine the physical shape; it retains no solid structure. Thus, feed rollers 105a and 105b can be used to stop the process (by retraction) and initiate the process (by extrusion) with high positional accuracy.

Although the metal in region 135 is molten, it is still a continuous electrical and uninterrupted electrical path, and no arc ever forms. This is an important contrast versus the MIG welding processes. Typical MIG welders operate at 100 or more amperes of current. The system according to the embodiments uses current levels 1/10 that. Because no arc is formed, and oxygen is excluded by either vacuum or inert gas shielding, there is no spatter or slag formation.

To contrast further with MIG-based 3D printing, in a MIG welding or cladding process, a constant-voltage (and thus dynamically-variable current) power supply supplies a wire electrode fed by a motor. In the MIG processes, the metal is melted by an arc (an electrically induced plasma); the process is dynamically stable as shortening the arc results in a great increase in current because of the constant-voltage characteristic of a MIG welding system, this causes a higher heat input into the metal and a more rapid melt-back. On the occasion that the MIG electrode wire shorts the arc, the output current increases rapidly and ohmic resistance causes the MIG electrode wire to melt rapidly.

The MIG process is not absolutely stable however because the melting process produces droplets of molten metal on the tip of the wire electrode, which alternately form and drip into the weld pool on the workpiece, so the current varies tens of times per second in a sawtooth as droplets form (shortening the arc and increasing the current) and detach (lengthening the arc, and decreasing the current). The deposition of these individual droplets and the dynamically changing heat contribute to the surface roughness of MIG-deposited 3D metal printing. In contrast, the invention uses no arc, the current is constant, and therefore the ohmic heating constant for any particular set of production parameters.

In particular, avoidance of arcing is part of a preferred embodiment of the invention to avoid arcing, vaporization, and spatter. Preferably, the power supply 115 is turned off during initial contact of wire 100 with the substrate 140 at the start of a section of deposit 145, and the current turned on after contact is first made by extending the wire 100 with feed rollers 105a and 105b. Similarly, it is preferred to decrease the current to zero at the end of a section of deposit 145 before wire retraction, again to avoid arcing, vaporization, and spattering. For this reason, in a preferred embodiment of the invention, the open-circuit voltage of the power supply should be insufficient to strike or maintain an arc; for air, argon, nitrogen, or carbon dioxide at normal atmospheric pressure, the voltage required to create or maintain an arc is typically 18 volts to 24 volts. For this reason, a power supply with an open-circuit voltage below 18 volts, such as the range from three to six volts is preferred. Additionally, as minimizing sparking also minimizes spatter, a power supply with minimal to no output capacitance is preferred.

One may question why the ohmic heating supplied by power supply 115 is useful or necessary. The reason is the thermal gradient imposed by the laser beam 130. If the laser beam 130 is the sole heat source for the molten region 135, then two phenomena prevent economical part production: reflection, and vaporization.

Reflection is a lesser problem. For a $CO_2$ laser operating at 10 micron nominal wavelength, most steel alloys (including matte-finish stainless steel "as-drawn" wire) have a surface absorption of about 0.16 (that is, 84% of the laser power is reflected away and only 16% goes into actual heating). This makes the laser energy "expensive" in terms of both the physical laser which must be ~6 times larger than absolute heating requires, and of the electrical power input to that laser.

Vaporization is a bigger problem. If laser beam 130 is to supply sufficient heat to fully melt feedstock wire 100 from top to bottom (or side to side, as may be applicable according to the angle of laser beam 130), then one finds that for the useful range in diameter of feedstock wire 100 (diameters from roughly 0.003 to 0.010 inch, 75 to 250 micron), and a target feed rate of 1 Kg/hour of metal deposited, that with a laser power of roughly 100 watts (necessary to raise 1 Kg/hour of steel to about 2700 degC) the face of the feedstock wire 100 closest to the laser approaches the boiling point of steel (approximately 2900 degC) while the back of the feedstock wire has not yet achieved the melting point of steel (approximately 1500 degC). Thus, the face of the wire starts boiling before the back side of the wire fully melts.

Worse, the surface of substrate 140 stays well below 1000 degC. In this situation, a good fusion weld between the feedstock wire 100 and the substrate 140 does not occur and the deposit produced 150 has flaws and fusion defects, if indeed that any bond occurs at all.

In this case, increasing the laser beam 130 power level does not help; the face of feedstock wire 100 simply ablates and carries away the increased energy as vaporized metal. Almost none of the additional energy couples into the substrate 140.

Applying the laser beam 130 at a more inclined angle or targeted more toward substrate 140 rather than feedstock wire 100 does heat the substrate 140 more adequately, but the substrate 140 can be presumed to be of the same material (and thus same reflectivity) as feedstock wire 100. In that case, as described above, 84% of the energy of the laser beam reflects from the substrate surface; reasonable geometric optics predict that because of the great disparity in heat-sinking capacity between the substrate 140 and the feedstock wire 100 that the feedstock wire 100 begins to boil away before the substrate 140 reaches the melting point.

One solution to this problem is to increase the diameter of the feedstock wire and increase the focused spot diameter of the laser so that the dwell time from when the wire enters the laser spot to the time the wire exits the laser spot becomes long in comparison to the time it takes for the heat of the laser to conduct from the laser-facing side of the wire to the shadowed side of the wire. In this case of a large wire and large laser spot, the overall deposition rate in kilograms of metal per hour is maintained or even increases. On the downside, the relatively large wire diameter and large laser spot size cause the minimum feature size to be quite large, each layer of deposition to be quite thick, and so the final surface finish to be rather rough.

Another solution to this problem is to deposit much more slowly; decreasing the production target from 1 Kg of useful part per hour to 1/10th that (100 g/hour) indeed allows sufficient time for laser beam 130 to heat the feedstock wire 100 and substrate 140 in melt region 135 to adequately bond the deposit 145 to substrate 140.

However, this method is undesirable in a production environment because it drastically slows the rate of production. A cost analysis indicates that if one ignores the cost of the feedstock, then parts that are produced at 1/10 the speed are usually parts that are 10 times more expensive. Of course, if circumstances are such that speed of production is not important, then one preferred embodiment of the invention is a system that simply omits ohmic heating supply 115. Another preferred embodiment of the invention uses ohmic heating plus laser heating during longer sections of depositing wire 100 onto substrate 140, and uses laser beam 130 alone to establish and terminate the fusion at the start and end of each section of wire deposit.

This speed of production issue is the reason for including the ohmic heating power supply 115. First, the ohmic heating supply preheats the feedstock wire 100 in bulk and with 100% uniformity; there is no "wire facing the laser" vs. "wire facing away from the laser" differential, nor any reflection of energy away, unlike the 10 micron infrared laser reflection. Second, the same ohmic heating effect that heats feedstock wire 100 also heats the substrate 140 in the melt region 135, again with 100% efficiency.

A second-order effect improves the heating ratio between feedstock wire 100 and substrate 140: the effect of convection versus conduction. The feedstock wire 100 is exposed to natural (and if necessary, forced) convection cooling into the atmosphere in area 120, while substrate 140 in the melt region 135 is not cooled convectively.

Although intuitively it seems that convective losses in the wire heating region 120 are wasted energy and slows the process, the actual result is that ohmic heating power supply 115 heating in substrate 140 (which is only conductively cooled) actually couples energy preferentially into the substrate 140 rather than into the feedstock wire 100 because although the wire 100 has a smaller cross-section, the wire 100 can dissipate the heat much more readily by convection, versus the substrate 140. As a rule of thumb, in metals, free convection is 10 times more efficient at heat transfer than pure conduction, and forced convection/ventilation is 100 to 1000 times more effective at cooling than simple conduction.

Application to 3D Printing

The invention as described above and shown in FIG. 1 is amenable for direct use in a 3D printer to print metal. The invention can be mounted in a conventional XYZ gantry if it is acceptable to have all of the laydown deposits 150 parallel in all layers. In the situation where surface finish specifications do not allow for the initiation and termination of laydown deposits 150 at the surface, then a simple turntable supporting substrate 140 with a slip-ring to pass the current from power supply 115 will permit the laydown of deposit 150 in any relative direction in any layer as desired.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for printing a three-dimensional (3D) metallic part, comprising:
   a metal feedstock including a wire positioned through an electrical contact tube and is in contact with a workpiece that is electrically conductive, wherein a diameter of the wire is in a range of 0.003 to 0.010 inch;
   a power supply that is controllable connected to the electrical contact tube and supplies a current of a controllable amount through the electrical contact tube, to pass the current through the wire and to the workpiece, with the current returning to the power supply, such that the current is insufficient to melt the wire, and is less than 10 amperes, and the current produces heat energy via an ohmic heating to preheat the wire and the workpiece, wherein the current is an electrical current open circuit voltage below 18 volts that is insufficient to either, create, strike or maintain an arc, in a local atmosphere to the workpiece while printing;
   a deposit of a melt of the wire is deposited on the workpiece;
   a continuous electrical path that includes the wire, the electrical contact tube, the power supply, and the workpiece, the continuous electrical path being uninterrupted while the power supply is supplying the current;
   a laser beam is focused at a melt region located at a proximal end of the wire and the workpiece, wherein an energy of the laser beam coordinated with the ohmic heating produced by the current from the power supply in combination, heat the wire and a surface of the workpiece, while the wire is exposed to one of a natural convection or a forced convection cooling in an area located after the wire passes through the electrical contact tube, to before the wire contacts the workpiece, while the workpiece in the melt region is not cooled convectively;
   devices are extending the wire to the workpiece, the devices extending the wire to contact the workpiece to form the continuous electrical path before the power supply starts to supply the current;
   wherein the power supply supplies the current after the proximal end of the wire is in contact with a region of a surface of the workpiece and is heated to reach a melting temperature of both the wire and the region of the surface of the workpiece to create a weld pool, such that the ohmic heating and the energy of the laser beam are controlled to uninterruptedly maintain the continuous and uninterrupted electrical path through the weld pool on the workpiece, to create a section of the deposit of the melt of the wire on the workpiece; and
   wherein the power supply stops the current before the devices interrupt the continuous electrical path by retracting the wire from the deposit at the end of the section of the deposit.

2. The system of claim 1, wherein the wire is positioned between the devices and the devices are drive rollers, such that upon movement of the drive rollers, the wire moves through the electrical contact tube and into contact with the workpiece.

3. The system of claim 2, wherein the wire is in electrical contact with the electrical contact tube and the proximal end of the wire is in electrical contact with the workpiece.

4. The system of claim 3, wherein moving the wire, the laser beam, controlling the energy of the laser beam and the current used for the ohmic heating, are controlled independently, such that the controlling of the ohmic heating and an amount of power for the laser beam are controlled to maintain a stable weld pool on the workpiece while the wire is fed into the weld pool, wherein the weld pool is established and maintained by the combination of the laser beam and the ohmic heating.

5. The system of claim 4, wherein the controlled ohmic heating current and the amount of power for the laser beam and an amount of speed of the drive rollers are controlled in coordination by the system, such that the coordination is controlled to optimize the fusion of the wire to the workpiece and prior deposited metal while minimizing vaporization and spattering of melted metal.

6. The system of claim 1, wherein the produced heat energy via the ohmic heating heats the wire and the workpiece, so a total system deposit time for depositing wire on the workpiece is at a kilogram per hour or less, resulting in an amount of total depositing time for printing the 3D metallic part that is less than an amount of total system depositing time for depositing wire on a workpiece using a laser-only or electron-beam only heating for printing a same 3D metallic part.

7. The system of claim 1, wherein the wire is positioned between the devices, the devices are drive rollers, such that the drive rollers include motor-driven rollers.

8. The system of claim 1, wherein relative motions of the wire, the laser beam, and an amount of power for the laser beam power are coordinated independently by a constant-voltage via the controllable power supply that supplies the wire fed by a motor, to optimize fusion of the wire to the workpiece, and to minimize vaporization of the wire and the workpiece, and to minimize spatter.

9. A method for depositing a metal to form a three-dimensional (3D) part, comprising steps:
positioning a metal wire through an electrical contact tube and into contact with a workpiece that is electrically conductive;
supplying a current of a controllable amount via a power supply which is controllable to the electrical contact tube, wherein the current passes through a continuous electrical path that includes the wire, the electrical contact tube, the power supply, and the workpiece, such that the current is insufficient to melt the wire, and the current produces heat energy via an ohmic heating to preheat the wire and the workpiece, wherein the current is an electrical current open circuit voltage below 18 volts that is insufficient to either, create, strike or maintain an arc, in a local atmosphere to the workpiece while printing;
focusing a laser beam at a melt region located at an intersection of a proximal end of the wire and the workpiece, wherein a combination of an energy of the laser beam with the ohmic heating produced by the current from the power supply increase a bulk temperature of the wire and a surface of the workpiece, while the wire is exposed to one of a natural convection or a forced convection cooling in an area located after the wire passes through the electrical contact tube to before the wire contacts the workpiece, while the workpiece in the melt region is not cooled convectively;
using drive rollers to extend the wire to the workpiece such that the wire contacts the workpiece and forms the continuous electrical path before the power supply starts to supply the current;
supplying the current with the power supply such that the proximal end of the wire in contact with a region of a surface of the workpiece is heated to reach a melting temperature of both the wire and the region of the surface of the workpiece to create a weld pool, such that the ohmic heating and the energy of the laser beam are controlled to uninterruptedly maintain the continuous and uninterrupted electrical path through the weld pool on the workpiece;
depositing a melt of the wire on the workpiece creating a section of a deposit of the wire on the workpiece; and
stopping the current from the power supply before the drive rollers interrupt the continuous electrical path by retracting the wire from the deposit at the end of the section of the deposit.

10. A system for printing a three-dimensional (3D) metallic part, comprising:
a metal feedstock including a wire positioned between drive rollers, wherein the drive rollers move the wire through an electrical contact tube and into contact with a workpiece that is electrically conductive, wherein a diameter of the wire is in a range of 0.003 to 0.010 inch;
a power supply which is controllable connected to the electrical contact tube supplies a current of a controllable amount through the electrical contact tube, through the wire and to the workpiece, with the current returning to the power supply, wherein the current is insufficient to melt the wire, and wherein the current is less than 10 amperes, and the current produces heat energy via an ohmic heating to preheat the wire and the workpiece, and wherein the current is an electrical current open circuit voltage below 18 volts that is insufficient to either, create, strike or maintain an arc, in a local atmosphere to the workpiece while printing;
a deposit of a melt of the wire is deposited on the workpiece;
a continuous electrical path comprising the wire, the electrical contact tube, the power supply, and the workpiece, the continuous electrical path being uninterrupted while the power supply is supplying the current;
a laser beam focused at a melt region located at an intersection of a proximal end of the wire and the workpiece, wherein an energy of the laser beam coordinated with the ohmic heating produced by the current from the power supply in combination, heat the wire and a surface of the workpiece, while the wire is exposed to one of a natural convection or a forced convection cooling in an area located after the wire passes through the electrical contact tube to before the wire contacts the workpiece, while the workpiece in the melt region is not cooled convectively, the drive rollers extending the wire to contact the workpiece to form the continuous electrical path before the power supply starts to supply the current;
wherein the power supply supplies the current after the proximal end of the wire is in contact with a region of a surface of the workpiece and is heated to reach a melting temperature of both the wire and the region of the surface of the workpiece to create a weld pool, such that the ohmic heating and the energy of the laser beam are controlled to uninterruptedly maintain the continuous and uninterrupted electrical path through the weld pool on the workpiece, to create a section of the deposit of the melt of the wire on the workpiece; and wherein the power supply stops the current before the drive rollers interrupt the continuous electrical path by retracting the wire from the deposit at the end of the section of the deposit.

11. A system for printing a three-dimensional (3D) metallic part, having a wire positioned through an electrical contact tube and is in contact with a workpiece which is electrically conductive, wherein the wire is a metal feedstock wire having a diameter in a range of 0.003 to 0.010 inch, the system comprising:

a power supply that is controllable is connected to the electrical contact tube and supplies a current of a controllable amount through the electrical contact tube, to pass the current through the wire and to the workpiece, with the current returning to the power supply, such that the current is insufficient to melt the wire, and is less than 10 amperes, and the current produces heat energy via an ohmic heating to preheat the wire and workpiece, wherein the current is an electrical current open circuit voltage below 18 volts that is insufficient to either, create, strike or maintain an arc, in a local atmosphere to the workpiece while printing;

a deposit of a melt of the wire is deposited on the workpiece;

a continuous electrical path comprising the wire, the electrical contact tube, the power supply, and the workpiece, the continuous electrical path being uninterrupted while the power supply is supplying the current;

a laser beam is focused at a melt region located at a proximal end of the wire and the workpiece, wherein an energy of the laser beam coordinated with the ohmic heating produced by the current from the power supply in combination, heat the wire and a surface of the workpiece, while the wire is exposed to one of a natural convection or a forced convection cooling in an area located after the wire passes through the electrical contact tube, to before the wire contacts the workpiece, while the workpiece in the melt region is not cooled convectively;

devices are extending the wire to the workpiece, the devices extending the wire to contact the workpiece to form the continuous electrical path before the power supply starts to supply the current;

wherein the power supply supplies the current after the proximal end of the wire is in contact with a region of a surface of the workpiece and is heated by raising a bulk temperature of the proximal end of the wire and a surface temperature of the region of the surface of the workpiece to reach above a melting temperature of the wire and a melting temperature of the surface of the workpiece to create a weld pool, such that the energy of the laser beam coordinated with the ohmic heating are controlled to uninterruptedly maintain the continuous and uninterrupted electrical path through the weld pool on the workpiece, such that the forming of a weld surface is determined by a surface tension of the weld pool, which then later solidifies into a cooling deposit at the location on the workpiece immediately thereafter to create a section of the cooling deposit, and upon repeated passes of the printing process produces a built-up area of solid material to construct the 3D metal part; and wherein the power supply stops the current before the devices interrupt the continuous electrical path by retracting the wire from the deposit at the end of the section of the deposit.

* * * * *